Oct. 15, 1963  D. M. MADIGAN  3,106,975
COLLAPSIBLE WEIGHING SCALE WITH CARRYING CASE
Filed April 20, 1962
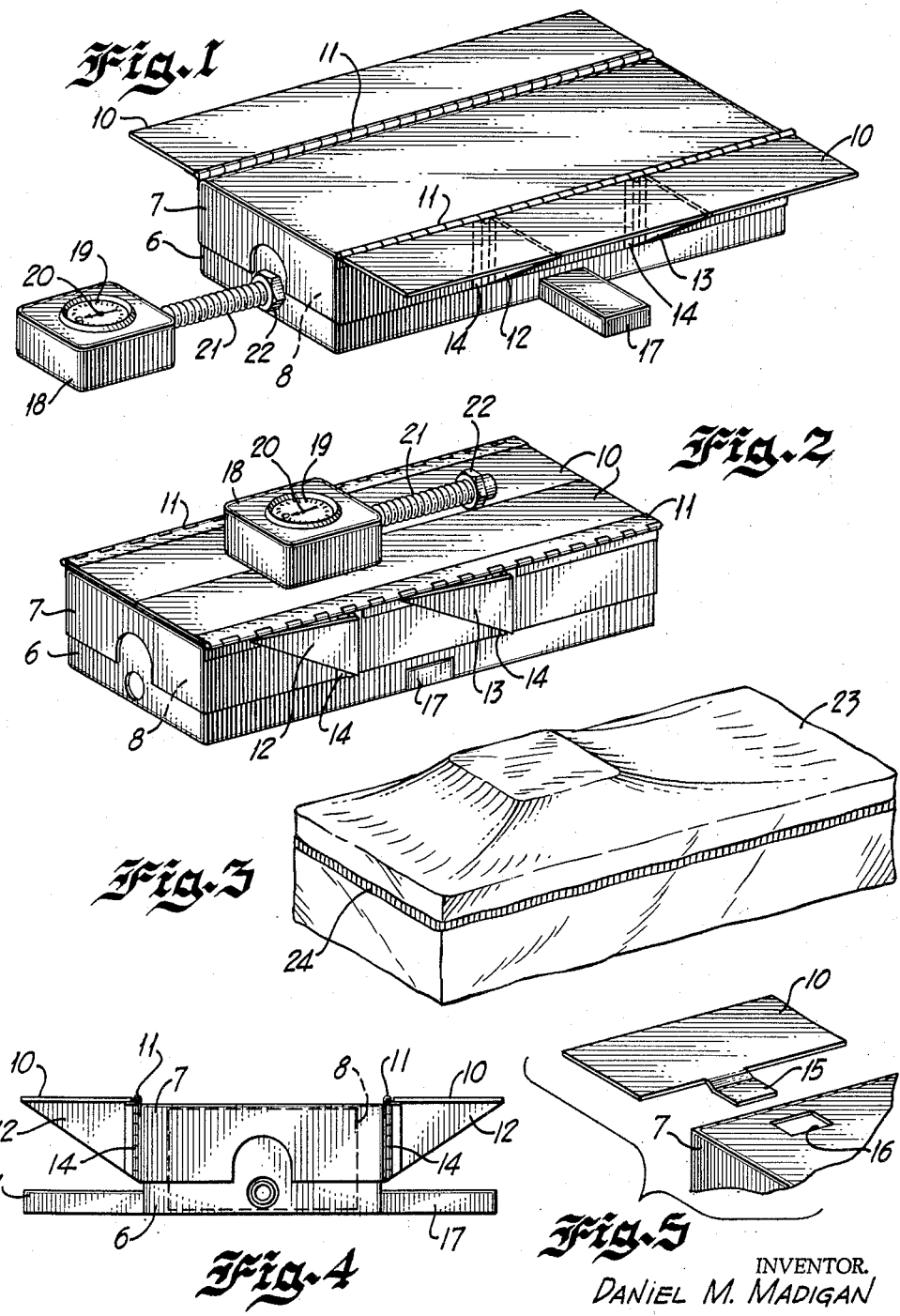
INVENTOR.
DANIEL M. MADIGAN
BY
McCanna, Morsbach & Pillote
ATTORNEYS.

United States Patent Office 3,106,975
Patented Oct. 15, 1963

3,106,975
COLLAPSIBLE WEIGHING SCALE WITH CARRYING CASE
Daniel M. Madigan, 5323 Conrad Ave., Skokie, Ill.
Filed Apr. 20, 1962, Ser. No. 189,137
2 Claims. (Cl. 177—126)

This invention relates to an improved weighing scale, particularly adapted for use when a person is traveling, although not limited to such use.

One of the objects of my invention is to provide an improved weighing scale characterized by its compactness and light weight and so constructed that it may be quickly and easily converted from a relatively small unit or units contained within a zipper type carrying case to a platform scale having extensions adapted for adequate support of suitcases, luggage, and other objects to be weighed.

Another object is to provide a weighing scale of the character described consisting of several units and an enclosing carrying case, one unit being a base provided with a suitable weighing mechanism and another unit being a dial type indicator detachably or otherwise associated with the weighing mechanism so as to be movable between a position in compact relation to the weighing unit and a position in which the dial indicator is extended from the weighing unit and from the weighing platform to provide for better visibility of the dial and easier reading of the dial scale.

Another object is to provide an improved weighing scale which is collapsible or foldable to a compact condition and which has extensible platform members providing an enlarged platform area well adapted to support suitcases, luggage, and other objects in the weighing position.

Another object is to provide a weighing scale of the character described so constructed that it may be manufactured at a comparatively low cost and serve in a satisfactory manner the purposes intended.

Other objects will be appreciated as the invention becomes better understood by reference to the following description in connection with the accompanying drawings, in which:

FIGURE 1 is a perspective view of a weighing scale embodying my invention, showing the parts in the weighing condition;

FIG. 2 is a perspective view of the scale with the parts in the collapsed or compact condition ready for placement in the carrying case;

FIG. 3 is a perspective view of a zipper type case enclosing the scale units, in accordance with my invention;

FIG. 4 is an end view of the weighing unit with the dial indicator unit removed; and FIG. 5 is a detail perspective view of a modified form of mounting the platform extensions.

My invention provides a weighing mechanism unit consisting of a base portion 6 and a platform portion 7. The base portion is preferably of rectangular shape and a height sufficient for housing a weighing mechanism of conventional construction designated by 8 shown in exterior outline in FIG. 4. The weighing platform engages the movable element of the weighing mechanism so that as the platform is depressed in response to the weight of an object resting thereon the mechanism will actuate a dial indicator or pointer which designates the weight of such object. The platform member 7 preferably has side walls 8 associated with the outer side walls of the base portion so that the platform portion may move down or up on the base portion according to the weight of the object to be weighed. A suitable spring means (not shown) normally urges the platform upwardly to move the dial pointer to the zero position, as is well understood in this art. The platform is provided at each side with a flat extension member 10 hinged at 11 to the platform unit as shown, or otherwise suitably connected thereto. When these extension members are swung to an open position as shown in FIGS. 1 and 4 they provide an extended width to the platform proper, thus serving to properly support a suitcase or other object placed on the platform for weighing. Retractible supporting members 12—13 suitably attached to the platform proper, provide further support for each extension member 10. In this embodiment each support is hingedly mounted at 14 to the adjacent side wall of the platform, so that the support may be swung from an inactive position adjacent to the sidewall as shown in FIG. 2 to a supporting position as shown in FIGS. 1 and 4. In FIG. 5 is shown a modification of mounting the extension members on the platform proper, consisting of an offset projection 15 adapted for insertion into a slot 16 in the top of the platform proper. One such connection 15—16 is provided near the end of each extension 10. This mounting serves to support the platform extension members 10 without the use of supports 12—13. A sliding support 17 is suitably mounted in each side of the base so as to be movable from a supporting position shown in FIGS. 1 and 4 to an inactive position shown in FIG. 2. The supports 17 serve to prevent the scale from tipping to either side when an object is placed on the platform for weighing.

A dial indicator unit designated generally by 18 is connected to the weighing mechanism 8 in such manner as to permit movement of such unit from an operative position outside the base substantially as shown in FIG. 1 to an inactive position in close and compact relation to the base as shown in FIG. 2. In the present embodiment this function is served by making the dial unit detachable from the base and weighing mechanism. In this form the unit includes a casing holding the indicator dial structure 19 and coacting pointer 20. The pointer is actuated by a member (not shown) disposed within a flexible tube 21 which is connected at one end to the dial casing and at its opposite end is detachably connected as by a screw-nut connection 22 to the base 6 with said dial actuating member operatively connected to the weighing mechanism 8 so as to be actuated thereby. When the scale is not in use the dial unit will be moved from its extended position to one in compact relation to the base and platform as, in this instance, by detaching the dial unit and placing it on top of the assembled base and platform shown in FIG. 2.

A casing designated generally by 23 is provided for enclosing the described parts and retaining them in position for handling and storing when the scale is not in use. This casing may be of flexible material and in the present embodiment it consists of a lower portion and an upper portion suitably connected together as by a zipper 24 to permit quick and easy opening and closing.

My improved weighing scale is further unique because of its size and intended range of use. In a preferred embodiment the base and platform may have an overall length and width of approximately 9" by 4", respectively, with the platform extensions each approximately 2" in width. This, together with the structural features characterizes the compactness of the scale. It should be understood, however, that my invention is not limited to these dimensions. The features which make the described compactness are particularly desirable when traveling. The small space occupied by the scale is advantageous. Also, the platform with its extensions will support ordinary suitcases and luggage and the weight is visible because of the location of the dial indicator at one side of the platform. The scale is also desirable because it permits weighing of suitcases preparatory to airline traveling in order to meet weight limitations. It will be apparent to those skilled in the art that changes may be made in details of construction and in the arrangement without departing from the spirit and scope of the invention expressed in the appended claims, in which I claim:

1. A weighing scale of the character described, comprising a base unit of relatively small length and width dimensions providing such compactness as to be normally unsuited for the weighing of suitcases and the like, the base unit comprising a base portion and a weighing mechanism housed therein, a platform portion covering the base portion of approximately the same top area as said base portion and connected with the weighing mechanism to actuate the same in response to a weight placed on the platform portion, weight indicating means associated with the base portion and adapted to be viewed from above, a platform extension member mounted on the platform member at each longitudinal side thereof normally occupying a position overlying such platform portion and adapted to be moved to an extension position to provide a platform extension overreaching the adjacent side of the base portion, and means associated with the base portion normally occupying a position within the sides of the base portion and adapted to be moved to an extended position beneath each said platform extension and coplanar with the bottom of the base portion to provide an extended base support coacting with the extended sides of the platform.

2. A weighing scale as set forth in claim 1 including retractible members operative between the platform portion and the platform extensions providing support for said extensions when they are in the extended position and adapted to be retracted to a non-supporting position.

References Cited in the file of this patent
UNITED STATES PATENTS

| | | |
|---|---|---|
| 153,699 | Barstow | Aug. 4, 1874 |
| 1,895,502 | Vernet et al. | Jan. 31, 1933 |
| 1,994,388 | Erichsen | Mar. 12, 1935 |
| 2,836,007 | Dodds | May 27, 1958 |
| 3,043,386 | Marion et al. | July 10, 1962 |

FOREIGN PATENTS

| | | |
|---|---|---|
| 1,014,893 | France | June 25, 1952 |